Feb. 6, 1951 E. P. G. WRIGHT 2,540,156

ELECTRIC SIGNALING SYSTEM

Filed June 7, 1947 5 Sheets-Sheet 1

INVENTOR
ESMOND P. G. WRIGHT
BY Robert Harding Jr
ATTORNEY

INVENTOR
ESMOND P. G. WRIGHT
BY Robert Harding Jr
ATTORNEY

INVENTOR
ESMOND P. G. WRIGHT
BY Robert Harding Jr.
ATTORNEY

Feb. 6, 1951 E. P. G. WRIGHT 2,540,156

ELECTRIC SIGNALING SYSTEM

Filed June 7, 1947 5 Sheets-Sheet 4

INVENTOR
ESMOND P. G. WRIGHT
BY Robert Harding Jr.
ATTORNEY

Feb. 6, 1951 E. P. G. WRIGHT 2,540,156

ELECTRIC SIGNALING SYSTEM

Filed June 7, 1947 5 Sheets-Sheet 5

| Digit | AX | AY | BX | BY | 1st. Pulse | 2nd. Pulse |
|---|---|---|---|---|---|---|
| 1 | X | | | | X | - |
| 2 | X | | X | | X | X |
| 3 | X | | | X | X | Y |
| 4 | X | | X | X | X | X,Y |
| 5 | | X | | | Y | - |
| 6 | | X | X | | Y | X |
| 7 | | X | | X | Y | Y |
| 8 | | X | X | X | Y | X,Y |
| 9 | X | X | | | X,Y | - |
| 0 | X | X | X | | X,Y | X |
| END OF SELECTION | X | X | | X | X,Y | Y |

INVENTOR
ESMOND P. G. WRIGHT
BY [signature]
ATTORNEY

Patented Feb. 6, 1951

2,540,156

UNITED STATES PATENT OFFICE 2,540,156

ELECTRIC SIGNALING SYSTEM

Esmond Philip Goodwin Wright, London, England, assignor to International Standard Electric Corporation, New York, N. Y., a corporation of Delaware Application June 7, 1947, Serial No. 753,221
In Great Britain January 18, 1946

6 Claims. (Cl. 177—380)

This invention relates to alternating current signalling systems and has for its object the provision of simple and cheap alternating current signal transmitting and receiving equipment for digit transmission, as for instance, in setting up automatic telephone connections.

One feature of the invention comprises alternating current signal transmitting equipment adapted to transmit coded digits by means of two frequencies only.

Another feature of the invention comprises alternating current signal receiving equipment adapted to receive coded digits, the complete code being formed from two frequencies only.

A complete description will now be given of one embodiment of the invention shown in the accompanying drawings in which.

The signal transmitting and receiving equipments are adapted to signal by means of two frequencies to be referred to as X and Y, which may be 600 C. P. S. and 750 C. P. S. or any other desired pair of voice frequencies.

Figures 1, 6:
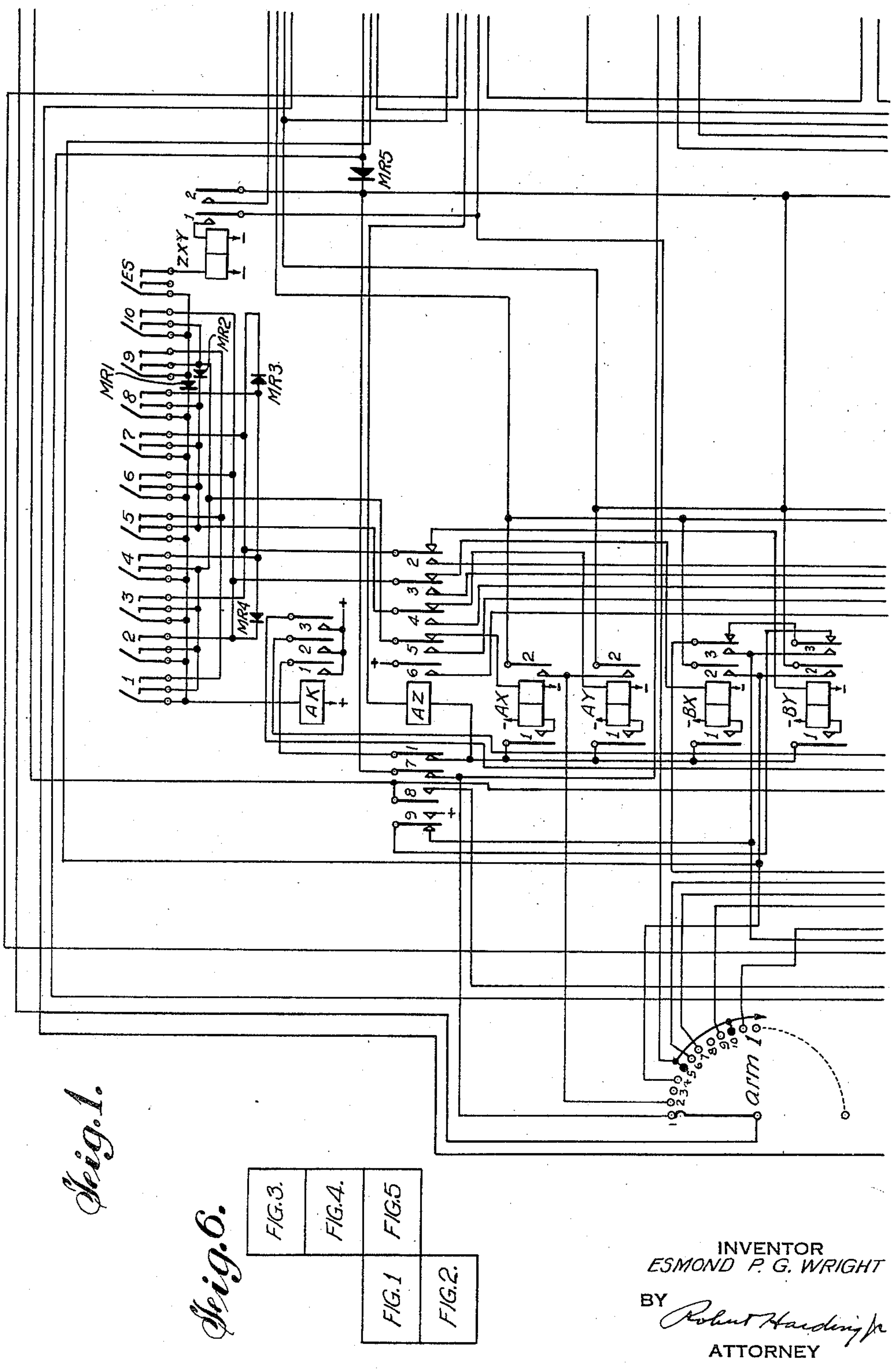
Figs. 1 and 2 show key sender digit-storage equipment at a first exchange, associated with voice frequency signal transmitting and receiving equipment which is individual to a four-wire outgoing trunk and is shown in Fig. 5.
Fig. 6 illustrates the manner in which the drawings are to be joined to provide the overall system.
Figure 2:
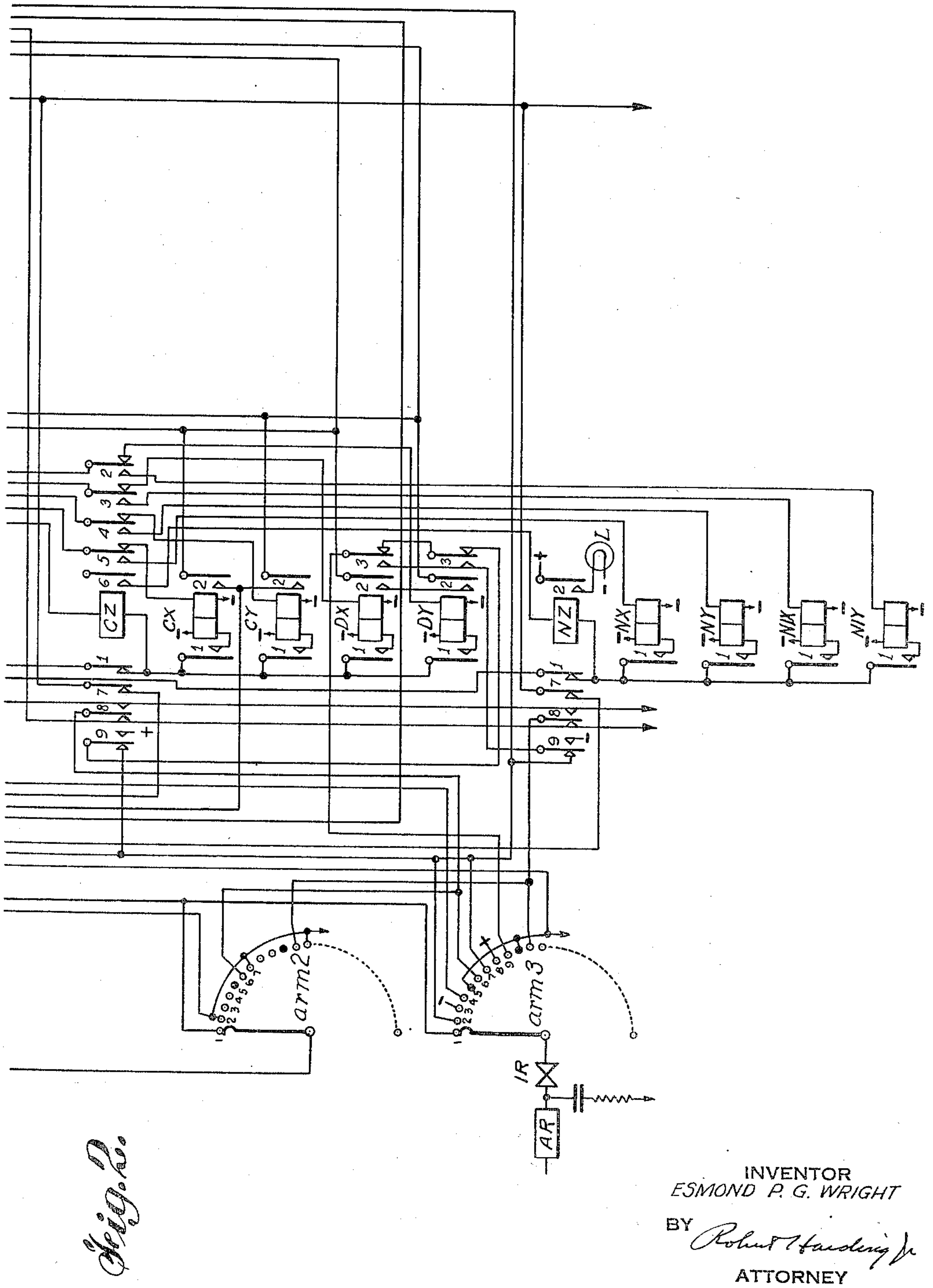

Figs. 1 and 2 show a method of storing a plurality of digits in response to key sending by an operator or subscriber. The operation of key 1 closes a circuit: positive battery relay AK, both contacts of key 1 in parallel, contacts *az5*, relay AX, to negative battery. Relays AK and AX operate and AX locks through its second winding, contacts *ax1*, *az1*, and *ak1*. When the key is released, relay AK releases and opens the short circuit across relay AZ which operates in series with and holds relay AX. Subsequent operations of AK will not again short circuit relay AZ because contacts *az1* are now open. The operation of other keys would cause the operation of other combinations of relays AX, AY, BX and BY, it being significant that with each combination either AX or AY or both will be operated. However, after the operation of relay AZ the four pulse wires are transferred to relays CX, CY, DX and DY (Fig. 2), on which a second keyed digit will be stored. After storage of the second digit has finished, AK again releases and relay CZ operates on the removal of the short circuit. The pulse wires are again extended to a further group of storage relays and so on. When the Nth and last group relays are operated relay NZ operates and lights a lamp on the sending position indicating that the sender is full. Alternatively this signal could be given to a subscriber as an audible tone. The operator or subscriber can now operate the eleventh key ES which causes the operation of relay ZXY. This relay locks via contacts *zxy1* and *e2*, Fig. 5. It will be obvious that the relay ZXY can be operated after any number of digits. The metal rectifiers MR1, 2, 3 and 4 are provided to segregate certain relay operating paths; the same effect could be achieved by adding additional springs on the pulse keys.

Figures 5, 7:
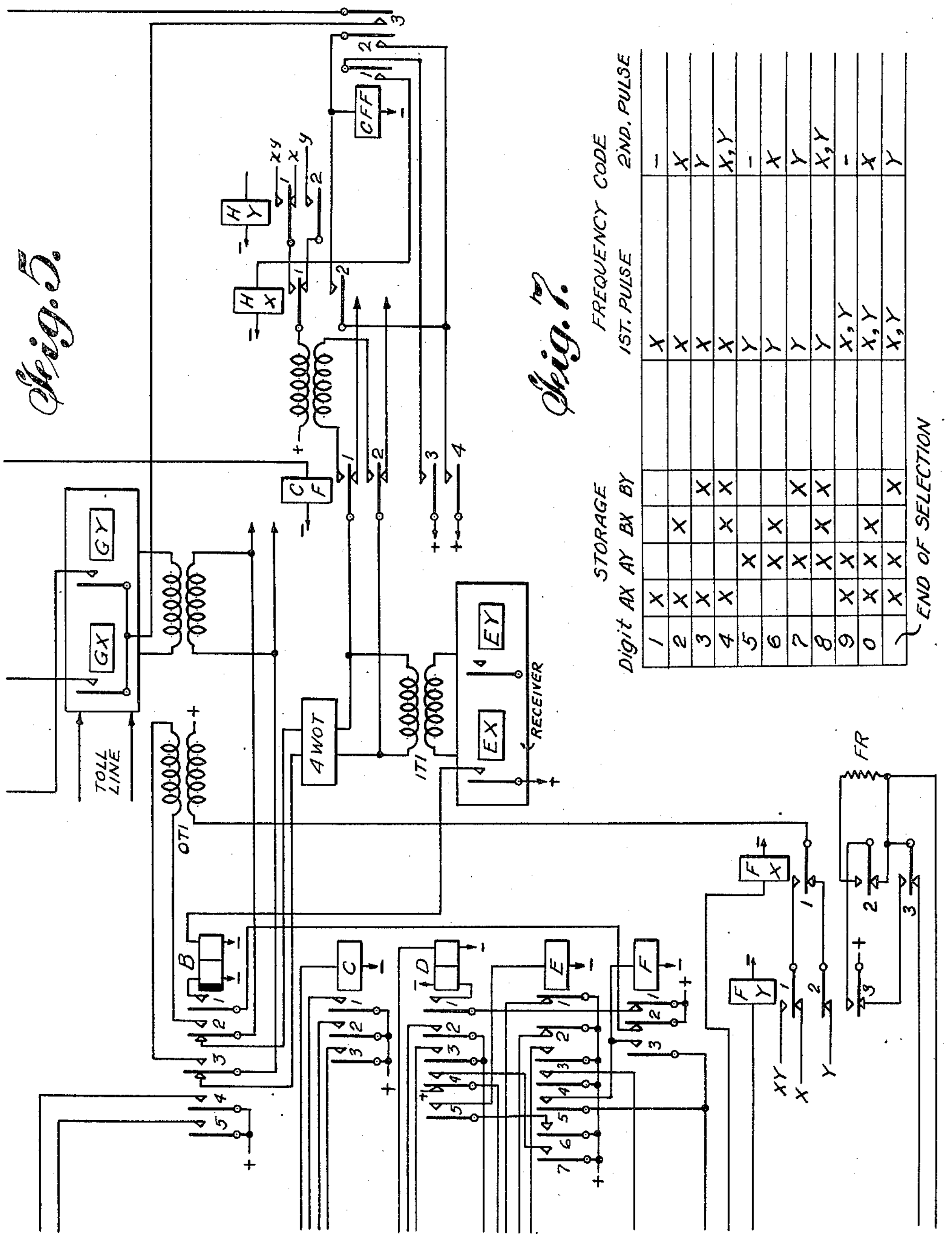
Fig. 7 shows the digit storage code and two frequency digit transmission code utilized in the present embodiment of the invention.

Fig. 5 shows the outgoing termination of a 4-wire long distance circuit 4WOT over which the stored digits are to be transmitted. Associated with the 4-wire circuit is a transformer IT1 which is also associated with a signalling receiver containing frequency responding devices of well known type including relays EX, EY adapted to operate in response to the frequencies X, Y respectively. There is also a transformer OT1 which is introduced by contacts *b2*, *b3*. The transformer OT1 is used for transmitting signals in conjunction with contacts *fx1*, *fy1* and *fy2* which connect the primary winding to different signal frequency supplies, X alone, Y alone, and X, Y together being connected by operation of *fx1*; *fy2*; and *fx1*, *fy1*, respectively. Fig. 2 also contains a sending switch AR with control relays C, D, E and F of Fig. 5. In addition Fig. 5 shows relays B, FX, and FY, which control the signalling on the line. It may be preferable to arrange the storage relays in a common circuit and in such circumstances a non-numerical switch would be used to interconnect the storage relays with the signal receiving circuit. Relays B, FX and FY would be in the signal receiving circuit and the wires for contacts *b4*, *b5*, *fx2*, *fx3* and *fy2* would be carried on to wipers together with the wires to the winding of relays FX and FY, these last two being the pulsing relays.

It is assumed that the direction required is controlled by a non-numerical selection such as an order wire key per direction as described in application Serial No. 721,892, filed January 14, 1947, and this operation would be carried out prior to and independent from the digit storage and transmission described in the present specification.

After the transmission of the seizing signal as described in the above-mentioned application it is arranged that the distant end sends back a proceed-to-send signal when it is ready to receive selection information. The seizing signal can be one of the one or two pulse two-frequency combinations not used for digit transmission, e. g. XY followed by XY. The proceed-to-send signal is in the opposite direction and a wide choice is available. The proceed-to-send impulse will cause the operation of relay EX in the receiver (Fig. 5). Closure of contacts *ex1* causes the operation of relay B which looks via *b1* operated, *f2* unoperated. When the first digit is recorded in the storage circuit of Figs. 1 and 2 the proceed-to-send signal is received, the following circuit steps the send switch to position 2; —, AR magnet (Fig. 2), interrupter springs IR, wiper *arm3*, contact 1, contacts *az8* and *b5*, +.

In position 2 a circuit is closed from +, contacts *b4*, wiper *arm1*, contact 2, contact *ax2* to relay FX and/or a similar circuit through contact *ay2* to relay FY, —. Thus, if the stored digit is one, relay AX is operated and relay FX operates and sends a signalling pulse over the line via OT1. Relay FX closes another stepping circuit for the sending switch AR over the contact 2, contacts *fx3*, *fy3*, +, but AR does not step until the discharge of the time circuit connected at the juncture of the magnet of AR and the interrupter IR.

In position 3 the circuit for relay FX is opened and the pulse ends but the switch magnet AR has a further circuit from the contact 3 so the switch advances to position 4. If neither of the relays BX or BY are operated the switch AR steps again through contact 4, contacts *bx3* and *by3* unoperated, *az9* operated, +. The switch also steps through contact 5, contacts *d4*, +, and comes to rest in position 6 where a check is made to see whether the second digit is yet stored. Assuming that the second digit is 4 and that relays CX, DX and DY are operated together with CZ. The stepping circuit for the switch magnet AR is completed through contact 6, contact *cz8*, *b5*, +. In position 7, relay FX is operated over wiper *arm1* and contact *cx2*. A signalling pulse of X frequency is transmitted via *fy1*, *fx1* to OT1, to line and the switch steps to contact 8 over contacts *fx2*, *fy3*, +. Relay FX releases and the switch steps to position 9: —, AR, interrupter springs, *arm3*, contact 8, +. In position 9, relays FX and FY operate over contacts *dx2* and *dy2* respectively and connect up a compound signal XY via *fy1*, *fx1* and OT1 to line. The sending switch has a stepping circuit from contact 9, contacts *dx3* operated, *nz9* unoperated, resistance FR, *fx2*, *fy3* both operated, +: the addition of the resistance FR gives time for the signal pulse for the compound signal. Further digits would be transmitted in the same way over corresponding relay contacts.

It has already been explained that the end of selection signal may occur after a variable number of digits. For simplicity of explanation it will be assumed that the digit 1 is transmitted followed by the end of selection signal, it being understood that the operation procedure after two, three or more digits would be similar. After the transmission of the first digit the switch AR is in position 6 and cannot advance because the relay CZ is not operated by the second digit. However, the contacts *zxy2* close a circuit for relay C through contacts *cz7*, contact 6, wiper *arm1*, *b4*, +. Contacts *c1* and *c2* close the obvious circuits for relays FX and FY and a signal pulse is transmitted. A stepping circuit for AR is provided through contacts 6 of wipers *arm3*, *arm2*, contacts *c3*, +. In position 7 the circuit of relay C is maintained through wiper *arm2* and relay D is operated in parallel therewith and locked via *d1*, *f1*.

The switch AR steps to position 8: contact 7, resistance FR, contacts *fx2*, *fy3*, +. Relay C releases. The switch advances to position 9 where a circuit is closed: relay FY, contacts *d3*, contact 9 of wiper *arm1*, contacts *b4*, +. Relay FX however releases. In due course the stepping circuit is closed via *arm3*, position 9, contacts *dx3*, *dy3*, *nz9*, *fx2* back, *fy3* front, +. In position 10 a circuit is completed for relay E via contacts *d5*, wiper *arm1*, contacts *b4*, +. Relay E locks to contacts *e6*. Contacts *e1* and *e2* open all the relay locking circuits of the storage group including ZXY, since CZ is dependent on AZ, and each Z relay dependent on the previous one, which for NZ is indicated by (N—2) Z in Fig. 2. Relays B and D remain operated. The switch steps out of position 10 via contacts *d4* and *e7*, +, and from position 11 via contacts *ez8*, *e4*, +. The switch is stepped over the remaining contacts up to 14 over similar circuits to those for positions 7, 8, 9, the circuits for positions 5 . . . 9 having been repeated. In the same way, the switch steps over further groups of five positions and returns to its home position where a circuit is closed for relay F over contact *e5*. Relay F opens circuits for relays D and B. B is slow releasing and meanwhile relays D and E release. When relay B eventually releases relay F releases also.

Figure 3:
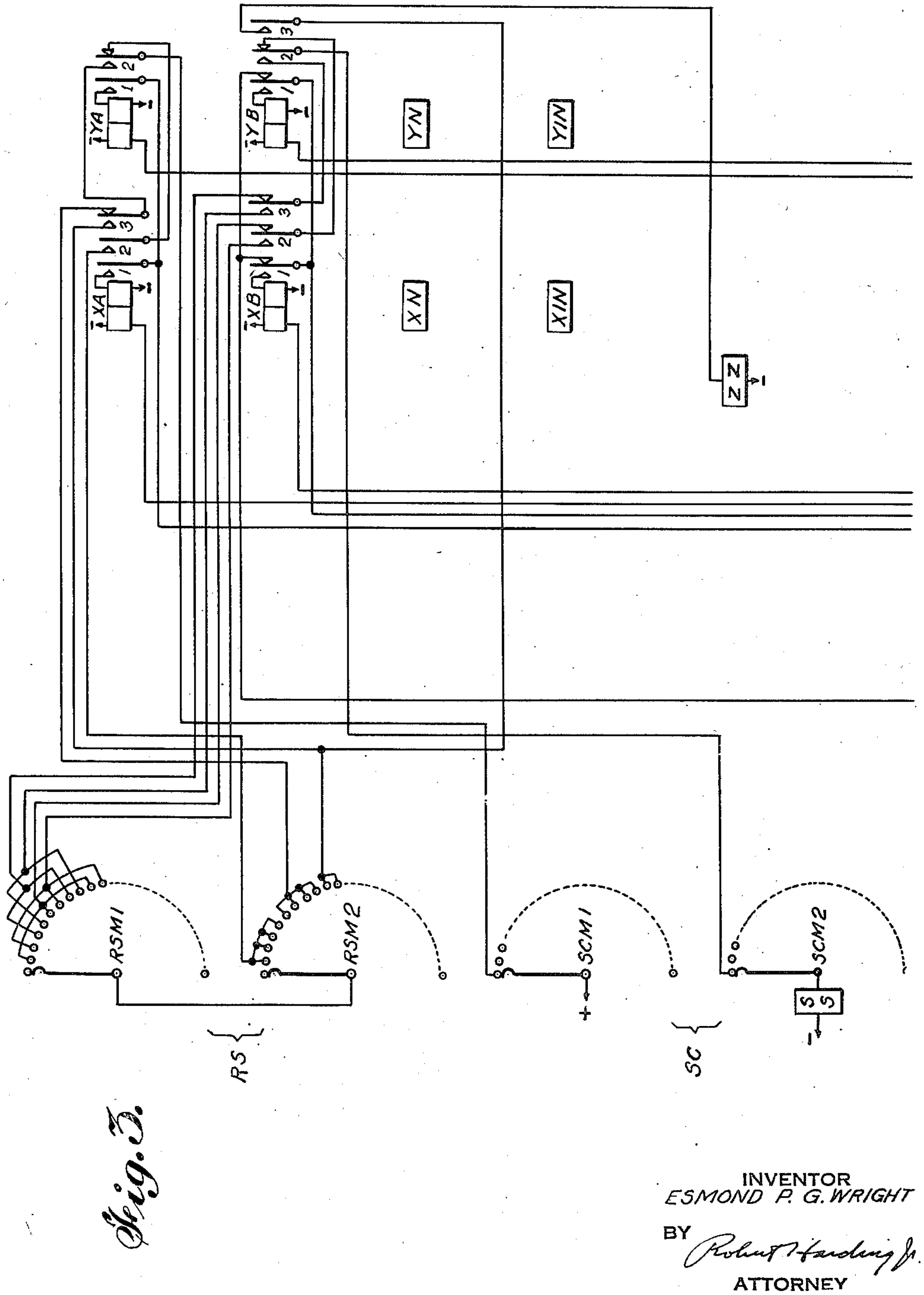
Figs. 3 and 4 show signal receiving equipment and digit-storage equipment at a second exchange.
Figure 4:
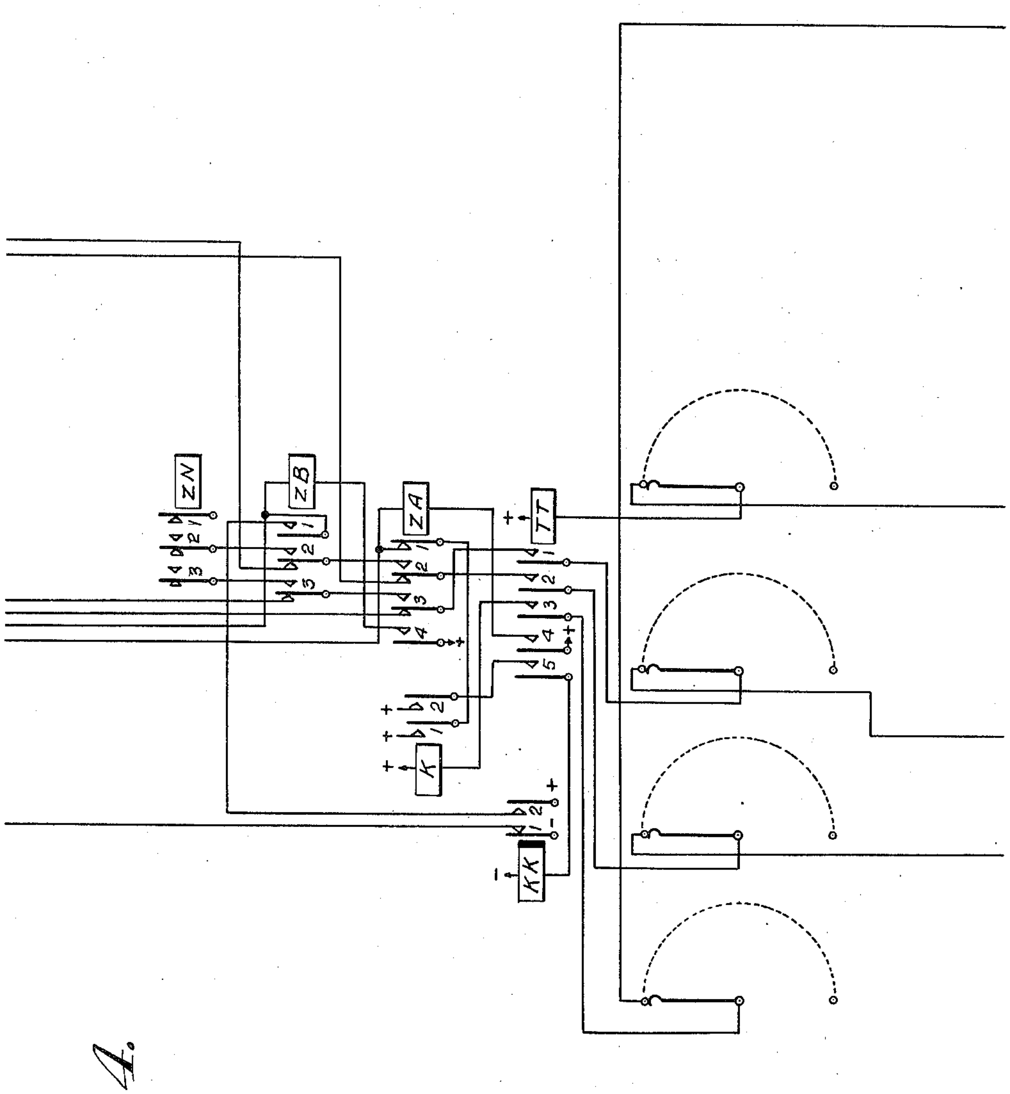

Figs. 3 and 4 illustrate the incoming end of the toll line and shows the essential part of the four-wire circuit and part of an incoming register. It is assumed that a seizing signal has been sent and this has caused the register to become associated terminating with the operation of relays TT (Fig. 4) in the register and CF and CFF in the line circuit (Fig. 5) in well-known manner causing the transmission of the proceed-to-send signal as described in the above mentioned application.

The incoming pulses pass to the signalling receiver causing the operation of relay GX, GY (Fig. 5) or both of these relays in known manner.

The receipt of the digit 1 causes a single operation of relay GX. This completes the circuit: —, relay XA, contacts *za3*, *tt1*, *gx1*, *cff3*, *tt3*, relay K, +. Relay K closes the obvious circuit for relay KK. Relays XA and K operate. When relay GX releases, relay K follows, opening a short circuit across relay ZA which operates in series with the locking winding of XA; +, *tt4*, *xa1*, XA, —. Relay KK releases slowly and then causes the operation of relay ZB via contacts *xb1*, *kk1* resistance —. The storage relay operating circuit is now switched through to the send set of four storage relays (not shown). Reception of digits on each set of storage relays is identical, and the reception of a digit 4 involving two successive pulses can be considered in relation to the first set of relays. In the case of the digit 4 the first X pulse would as before have caused the operation of GX, XA, K, KK, ZA, but before relay KK released both relays GX and GY would operate to the second pulse causing operation of relays XB and YB followed by operation of ZB when the short circuit at *k2* is removed.

It will be seen that slow release of relay KK times the period for receipt of a second pulse for a digit if required. The minimum period allotted to reception of a digit terminates when KK releases but if a digit comprises two pulses the period of reception is prolonged.

The end-of-selection signal may arrive on any stage group, although it will normally be expected in the last group and will cause the operation of a selection of the relays XN, YN and Y1N.

The stored digital information can be used to extend the connection by a number of well known methods, such as forward impulsing, backward impulsing, retransmission in code or some form of marking potential discrimination.

For all those methods it is necessary to scan the stored information one digit at a time.

For this purpose switches SC and RS are provided (Fig. 3), SC being an output sequence switch and RS a numerical control switch. Switch SC will be stepped under well-known controls determined for instance by the fact that each digit in turn has been used for selection control. After each step of SC, a check would be made to ensure that the next digit has been received that is, that relays ZB, ZN, ZD, in turn have been operated, after which switch RS will be caused to step in well-known manner and will be stopped when a position is reached marked by closed contacts of the relay group e. g. XA, YA, XB, YB, via contact banks *rsm1*, *rsm2*. Thus RS will be stopped by the operation of relay SS after a single step if relay XA only is energised, the circuit being; —, relay SS, wiper *scm2*, *yb2* back, *xb2* back, wiper *rsm1*, wiper *rsm2*, *xa2* front, *ya2* back, wiper *scm1*, +. Relay SS will advance the switch SC in preparation for the next digit.

There would be of course the usual well-known sequence control arrangements for rendering effective the contacts of successive storage relay groups for controlling the setting of switch RS. When the end-of-selection signal is received, relay ZZ operates over a circuit controlled by the storage relay group concerned which is exemplified by —, ZZ, *yb3* front, *xa3* front, *ya2* front, wiper *scm1*.

Operation of ZZ will stop the selection operations and cause the register to initiate the next function in the setting up of a connection in well-known manner.

The operation of the combination of storage relays corresponding to the end of selection signal may occur in any storage group depending on how many digits are contained in the required number.

What is claimed is:

1. In an electric signalling system, means for transmitting coded signals, each said signal consisting of one or two pulses of alternating current, means for forming a pulse of one or the other or both of two frequencies only, a plurality of relays arranged in groups, means for operating said relays for storing digits in code, there being less relays in each group than the possible value of a digit to be stored, and a single sending means for transmitting said pulses for each said coded signal as determined by said groups of said operated relays.

2. In an electric signalling system, means for transmitting coded signals, each said signal consisting of one or two pulses of alternating current, means for forming a pulse of one or the other or both of two frequencies only, storage devices for storing digits to be transmitted in code, a storage device for storing a supervisory signal after any one or more digits have been stored, there being less of said storage devices for storing any digit than the possible value of said digit, a single sending means for transmitting said pulses for each said coded signal as determined by said storage devices, and means for transmitting said supervisory signal and for returning said sending means to normal.

3. In an electric signalling system, means for transmitting alternating current pulses of one or the other or both of two frequencies, means comprising groups of relays for storing coded combinations representing different numerical values, there being a lesser number of relays in each group than the possible numerical value to be stored, numerical pulse controlling means for operating said transmitting means to transmit series of said pulses in accordance with said coded combinations to represent different numerical values, and signal pulse controlling means for operating said transmitting means to transmit a series of said pulses in one or more other coded combinations to represent non-numerical signals.

4. In an electric signalling system, means for transmitting alternating current pulses of one or the other or both of two frequencies, means for storing coded combinations representing different numerical values, marking means for marking the storage of any number of said coded combinations, pulse controlling means for operating said transmitting means to transmit a series of said pulses in accordance with said coded combinations representing different numerical values, and means controlled by said marking means for controlling said transmitting means to transmit a series of said pulses in coded combinations to signal the end of said numerical coded combinations after any desired number (including one) of said numerical coded combinations have been transmitted.

5. In an electric signalling system, storage means for storing a plurality of digits in code, a sending device responsive to the operation of said storage means for sending over the line a signal for each digit comprising one or two alternating current pulses of equal time duration, each pulse having one or the other or both of two predetermined frequencies, and circuit means for holding said sending device inoperative after pulses representative of one digit have been sent until the next digit has been stored in said storage means.

6. In an electric signalling system, the combination according to claim 5, in which the storage means comprises a plurality of relays for each digit and the sending device comprises a sequence switch controlled by the setting of the storage relays.

ESMOND PHILIP GOODWIN WRIGHT.

REFERENCES CITED

The following references are of record in the file of this patent:

UNITED STATES PATENTS

| Number | Name | Date |
|---|---|---|
| 2,117,580 | Snavely | May 17, 1938 |
| 2,206,538 | Rhodes | July 2, 1940 |
| 2,225,680 | Boswau | Dec. 24, 1940 |
| 2,319,339 | Muller | May 18, 1943 |
| 2,395,132 | Mackenzie | Feb. 19, 1946 |
| 2,395,693 | Sorenson | Feb. 26, 1946 |

FOREIGN PATENTS

| Number | Country | Date |
|---|---|---|
| 374,831 | Great Britain | June 20, 1932 |
| 375,349 | Great Britain | June 20, 1932 |